United States Patent
Heyman et al.

(10) Patent No.: US 7,454,972 B2
(45) Date of Patent: Nov. 25, 2008

(54) METHOD AND APPARATUS FOR ACOUSTICALLY WEIGHING MOVING LOADS

(75) Inventors: Joseph S. Heyman, Williamsburg, VA (US); John E. Lynch, Williamsburg, VA (US)

(73) Assignee: Luna Innovations Incorporated, Roanoke, VA (US)

( * ) Notice: Subject to any disclaimer, the term of this patent is extended or adjusted under 35 U.S.C. 154(b) by 92 days.

(21) Appl. No.: 11/513,348

(22) Filed: Aug. 31, 2006

(65) Prior Publication Data

US 2007/0062289 A1 Mar. 22, 2007

Related U.S. Application Data

(60) Provisional application No. 60/714,333, filed on Sep. 7, 2005.

(51) Int. Cl.
*G01N 19/08* (2006.01)
*G01N 29/07* (2006.01)

(52) U.S. Cl. .............................. 73/597; 73/602; 73/799

(58) Field of Classification Search ................ 73/580, 73/583, 581–582, 587, 596–600, 602, 588–595, 73/778, 799, 801; 367/131, 135
See application file for complete search history.

(56) References Cited

U.S. PATENT DOCUMENTS

| 4,014,208 | A | | 3/1977 | Moore et al. |
|---|---|---|---|---|
| 4,015,464 | A | | 4/1977 | Miller et al. |
| 4,062,227 | A | | 12/1977 | Heyman |
| 4,117,731 | A | | 10/1978 | Heyman |
| 4,225,926 | A | * | 9/1980 | Wendt ........................ 701/124 |
| 4,265,120 | A | | 5/1981 | Morris et al. |
| 4,363,242 | A | | 12/1982 | Heyman |
| 4,413,518 | A | | 11/1983 | Jones |
| 4,471,657 | A | | 9/1984 | Voris et al. |
| 4,604,738 | A | * | 8/1986 | Aggarwal et al. ........... 367/135 |
| 4,624,142 | A | | 11/1986 | Heyman |
| 4,823,609 | A | | 4/1989 | Yost |
| 4,843,346 | A | | 6/1989 | Heyman et al. |

(Continued)

OTHER PUBLICATIONS

Provisional Patent Application of Heymann et al.; "A Differential Guided Wave Nonlinear Spectroscopy System;" U.S. Appl. No. 60/476,218, filed Jun. 6, 2003.

(Continued)

*Primary Examiner*—Helen C. Kwok
(74) *Attorney, Agent, or Firm*—Nixon & Vanderhye P.C.

(57) ABSTRACT

Acoustic weight or mass sensing technology (referred to here as Acoustic Weigh In Motion (AWIN)) provides accurate weighing of any type of moving load moving over a load bearing medium. Acoustic transducers are affixed to or embedded in the load bearing medium. One or more source acoustic transducers propagate an acoustic wave over an acoustic path through the medium between the source and receiver transducers when the medium is in an unloaded state. The wave is detected at one or more receiving acoustic transducers. A propagation time delay is determined for the unloaded state. When a moving load travels over the acoustic path in the medium, the acoustic propagation time delay for that loaded state is determined. The difference between the acoustic propagation time delays for the unloaded and loaded states is determined. That acoustic propagation time delay difference is used to determine the weight or mass of the moving load.

24 Claims, 9 Drawing Sheets

U.S. PATENT DOCUMENTS

| | | | |
|---|---|---|---|
| 5,115,681 A | | 5/1992 | Bouheraoua et al. |
| 5,170,366 A | | 12/1992 | Passarelli |
| 5,237,516 A | | 8/1993 | Heyman |
| 6,771,563 B1 | * | 8/2004 | Bernard .................. 367/131 |
| 7,034,660 B2 | * | 4/2006 | Watters et al. ........... 340/10.41 |
| 7,071,841 B2 | * | 7/2006 | Haynes et al. .............. 340/943 |
| 7,082,833 B2 | | 8/2006 | Heyman et al. |
| 2005/0072236 A1 | * | 4/2005 | Heyman et al. ............... 73/602 |

OTHER PUBLICATIONS

Patent Application of Heyman et al.; "Bond Testing System, Method, and Apparatus;" U.S. Appl. No. 10/816,667, filed Apr. 2, 2004.

Joseph S. Heyman; "Residual Stress Characterization with a Magnetic/Ultrasonic Technique;" proceedings of IEEE, 1984 Ultrasonics Symposium, Dallas, TX; Nov. 14-16, 1984; pp. 950-954.

Sidney G. Allison, Joseph S. Heyman, and K. Salama; "Ultrasonic Measurement of Residual Deformation Stress in Thin Metal Plates Using Surface Acoustic Waves;" proceedings of IEEE 1983 Symposium, Atlanta, GA; Oct. 31-Nov. 2, 1983; pp. 995-999.

Joseph S. Heyman and Larry L. Yoder; "An Interferometric Measurement of the Acoustoelastic Constant of Rock Core Samples;" proceedings of IEEE, 1983 Symposium, Atlanta, GA; Oct. 31-Nov. 2, 1983; pp. 980-983.

Joseph S. Heyman and Wolfgang Issler; "Ultrasonic Mapping of Internal Stresses;" proceedings of IEEE 1982 Ultrasonics Symposium, San Diego, CA; Oct. 27-29, 1982; pp. 893-897.

Joseph S. Heyman; "A CW Ultrasonic Bolt-Strain Monitor;" SESA Experimental Mechanics, 17; 1977; p. 183.

J.E. Lynch, J.S. Heyman, and A.R. Hargens; "Ultrasonic Device for the Noninvasive Diagnosis of Compartment Syndrome;" Physiological Measurement, vol. 25, Issue 1, 2004; pp. N1-N9.

Robert S. Rogowski, Milford S. Holben, Patrick Sullivan, and Joseph S. Heyman; "A Method for Monitoring Strain in Large Structures: Optical and Radio Frequency Devices;" presented at the Review of Progress in Quantitative Nondestructive Evaluation, Williamsburg, VA; Jun. 21-26, 1987; pp. 559-563.

Sidney G. Allison, Joseph S. Heyman, Min Namkung, and K. Salama; "Ultrasonic Characterization of Plastic Deformation in Metals;" Review of Progress in Quantitative NDE; Plenum Press, New York (1986); pp. 1565-1573.

"Pulsed Phase-Locked-Loop Strain Monitor" A high-resolution, fully-automated strain monitor; NASA Tech Brief; Langley Research Center, Hampton, VA; Spring 1981, B-81-10068, LAR-12772.

S.G. Allison, J. S. Heyman, K. Smith, and K. Salama; "Effect of Prestrain Upon Acoustoelastic Properties of Carbon Steel;" 1984 Ultrasonics Symposium; NASA Langley Research Center, Hampton, VA; pp. 997-1002.

J. Frankel and W. Scholz; "Ultrasonic Studies of Stresses and Plastic Deformation in Steel During Tension and Compression;" US Army Armament Research, Development, & Engineering Ctr., Watervliet, NY; pp. 1577-1584.

J. S. Heyman, S. G. Allison, and K. Salama; "Influence of Carbon Content on Higher-Order Ultrasonic Properties in Steels;" 1983 Ultrasonics Symposium; NASA-Langley Research Center, Hampton, VA; University of Houston, TX; pp. 991-994.

M. Namkung, R. DeNale, and D. Utrata; "Uniaxial Stress and Wave Mode Dependence of Magnetoacoustic Responses in Iron-Base Alloys;" NASA Langley Research Center, Hampton, VA.

* cited by examiner

Figure 11

METHOD AND APPARATUS FOR ACOUSTICALLY WEIGHING MOVING LOADS

CROSS-REFERENCES TO RELATED APPLICATIONS

This application claims domestic priority from provisional application Ser. No. 60/714,333 filed Sep. 7, 2005, the disclosure of which is incorporated herein by reference.

TECHNICAL FIELD

The technical field relates to weight or mass determination. The technology described here provides for acoustic sensing of loads moving on a load bearing surface, such as a road, an aircraft runway, a sidewalk, etc.

BACKGROUND

There is a need for a robust, accurate, and built-in weighing system for highways (and other applications)—not only to determine vehicle weights for freight accuracy and weight compliance—but also for security reasons. Every roadway can be a path for the transport of illegal cargo. In one example of transport of hazardous materials, chemical, biological, or radiation monitors may be used to detect such materials. But many of those materials may be shielded from detection using various linings, like a lead lining or other heavy absorbing materials such as concrete. In that situation, a vehicle with an adequate suspension could carry a hazardous payload undetected by chemical, biological, or radiation monitors. That vehicle, however, will exceed statistical weight limits and could be identified by a weigh-in-motion sensor built into the highway. If a network of weigh-in-motion sensors were constructed, detection and surveillance of suspect vehicles could be readily accomplished. Ideally, that network should be invisible, highly verifiably accurate, able to obtain weight at high vehicular speeds, cost effective, potentially able to be wireless, to be robust and exhibit a long life.

Current technology for weighing vehicles employs a scale supported independently from the roadbed. The scale may use one or more types of sensors to measure weight such as strain gauges, springs, pressure sensors, and deflectometers. These scales require a vehicle to be stationary or nearly stationary for weight measurement, a measurement platform concentrating the vehicle load to a sensor(s) (spring or strain gauge or other device), and a readout device such as a deflection scale or an electronic readout.

There is a need for an accurate, robust, reliable, and easily-implemented method to weigh moving vehicles. The technology described below meets these and other needs using acoustic sensors attached to or embedded in the load bearing medium, e.g., the road. Although piezoelectric sensors are embedded in a highway, they are less than optimal. Because a piezoelectric sensor measures strain, vehicle weight would have to be inferred based on how the vehicle weight is conducted to the piezoelectric sensor. This is problematic because the vehicle may move over the device at unpredictable distances. Also, piezoelectric devices are usually covered with a layer of material whose stiffness can change in time and can wear altering the calibration and therefore accuracy of the piezoelectric sensor output. Piezowires are fragile and can be damaged in use. There are similar problems with burying other types of sensors, like linear voltage differential transducers (LVDTs), capacitive plates, inductive gap systems, optical fibers and other discrete sensors, in the roadbed.

SUMMARY

Acoustic weight or mass sensing technology (referred to here as Acoustic Weigh In Motion (AWIN)) provides accurate weighing of any type of moving load moving over a load bearing medium. Example loads include moving vehicles of any type and moving objects like people and animals. Example load bearing media include a road, a bridge, an aircraft runway, a walkway for people or animals, an aircraft carrier, a moving beltway, etc. Acoustic transducers are affixed to or embedded in the load bearing medium. One or more source acoustic transducers propagate an acoustic wave over an acoustic path through the medium between the source and receiver transducers when the medium is in an unloaded state. The propagated acoustic wave is detected at one or more receiving acoustic transducers. A propagation time delay is determined for the unloaded state. When a moving load travels over the acoustic path in the medium, the acoustic propagation time delay for that loaded state is determined. The difference between the acoustic propagation time delays for the unloaded and loaded states is determined. That acoustic propagation time delay difference is used to determine the weight or mass of the moving load or both.

A baseline for the acoustic wave propagation time delay associated with the acoustic path in the unloaded state may be established by determining the acoustic wave propagation time delay associated with the acoustic path in the unloaded state over time to account for environmental or other changes to the unloaded state. The baseline is used to ensure that the determined acoustic propagation time delay difference between the first and second acoustic propagation time delays for the unloaded and loaded states is attributable to the moving load over the acoustic path. In addition, a moving load with a known weight or mass may be used to calibrate (initially or periodically) the acoustic wave propagation time delay associated with the acoustic path in one or both of the unloaded state and the loaded state.

The acoustic propagation time delay difference is associated with a change or difference in a velocity V of the acoustic wave over the acoustic path, where $V=2FL/M$, F is the acoustic wave frequency, L is a distance between the source and receiver transducers, and M is a constant depending on a harmonic of the acoustic wave. The frequency of the acoustic wave is proportional to its velocity in a phase-locked system, and frequency is related to phase, i.e., frequency defines the rate at which the instantaneous phase changes. A phase shift is related to a time delay by a factor of $2\pi F$. So in one non-limiting example AWIM implementation, the acoustic propagation time delay difference is determined using a phase locked loop to accurately determine the change in time delay.

Various other non-limiting AWIM implementations and features are described. For example, multiple source and receiving acoustic transducers may be attached to or embedded in the load bearing medium and each source-receiver transducer path through the load bearing medium defines an associated acoustic path. Acoustic propagation time delay differences for the associated acoustic paths are determined. A weight or mass of the moving load based on the acoustic propagation time delay differences is then calculated. In another example, one or more cameras may also be employed to image the moving load to determine information for identifying the moving load. In a still further example, weight or mass profiles may be developed for particular moving objects, and the weight or mass profiles are then used to identify a particular object moving over the acoustic path.

Multiple source acoustic transducer and multiple receiver acoustic transducers may be arranged in an array across an area of the load bearing medium to establish multiple acoustic paths through the load bearing medium between each source-receiver acoustic transducer pair. Certain ones of the source-receiver acoustic transducer pairs may then be selected to determine a weight or mass associated with a moving load at a particular point within that area of the load bearing medium. Another example implementation employs a network of source-receiver acoustic transducer pairs at different geographic locations. A person and/or a computer can be used to monitor the mass or weight of moving loads at those different geographic locations.

DETAILED DESCRIPTION

The following description sets forth specific details, such as particular embodiments, procedures, techniques, etc. for purposes of explanation and not limitation. But it will be appreciated by one skilled in the art that other embodiments may be employed apart from these specific details. For example, although the following description is facilitated using a non-limiting example application to roads and vehicles like trucks, AWIM may be employed to detect the weight or mass of any moving object supported on a load bearing medium. In some instances, detailed descriptions of well known methods, interfaces, circuits, and device are omitted so as not obscure the description with unnecessary detail. Moreover, individual blocks are shown in some of the figures. Those skilled in the art will appreciate that the functions of those blocks may be implemented using individual hardware circuits, using software programs and data, in conjunction with a suitably programmed digital microprocessor or general purpose computer, using application specific integrated circuitry (ASIC), and/or using one or more digital signal processors (DSPs).

Figure 1:
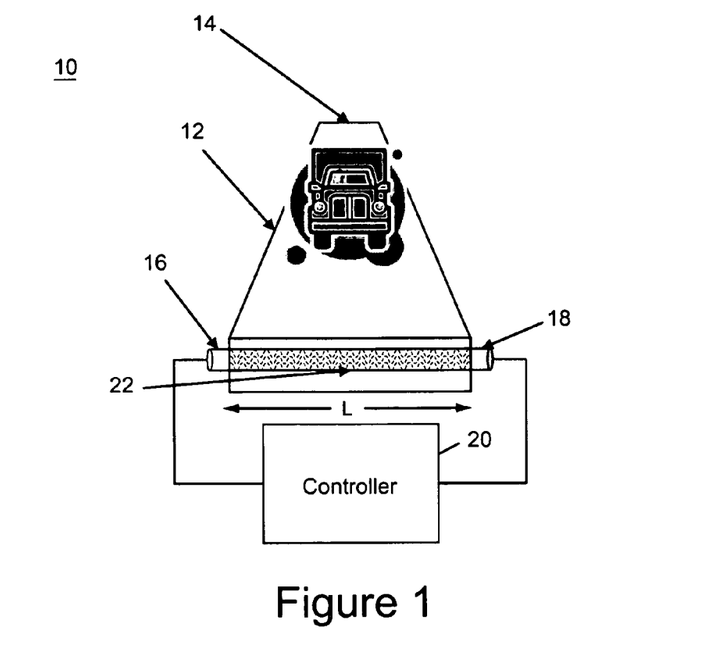
FIG. 1 illustrates a non-limiting example of AWIM applied to weighing a truck moving over a road.

Reference is made to the acoustic weigh in motion (AWIM) system 10 shown in FIG. 1. A load bearing medium 12, (shown as a road bed), supports a moving vehicle 14 (shown as a truck). Although the example here is a road surface, it will be understood that AWIM may be applied to any load bearing medium. Non-limiting example load bearing media include roads, bridges, ship decks, aircraft runways (both stationary and moving), walkways, moving belts, moving human and/or animal support medium, etc. As explained above, AWIM may be applied to determine the weight or mass of any moving object that creates a load on the load bearing medium. Non-limiting examples of moving objects/loads include vehicles, people, animals, etc.

An acoustic source transducer 16 is attached to or embedded in the load bearing medium 12 as is an acoustic receiver transducer 18 at a predetermined distance L from the source transducer 16. An acoustic wave 22 launched by the source transducer 16 propagates over an acoustic propagation path through the load bearing medium to the receiver transducer 18. More than one source and/or receiver transducer may be used. A non-limiting example acoustic transducer is a piezo-electric transducer, but other acoustic transducers may be used. The source and receiver transducers 16 and 18 are coupled to an AWIM controller 20 creating a closed path from the source transducer 16, to the receiver transducer 18, through the AWIM controller 20, and back to the source transducer 16.

An acoustic wave propagates through the load bearing medium at a certain velocity when the load bearing medium is unloaded by the weight of a vehicle 14. When the vehicle 14 drives over the portion of the load bearing medium with the acoustic propagation path, it compresses that portion of the load bearing medium and causes some deformation. That compression and deformation alter the propagation velocity and path length of an acoustic wave traveling through the load bearing medium along the acoustic propagation path. The difference in acoustic wave propagation is sensed by the controller 20, which converts that difference into a weight or mass of the moving vehicle 14.

Figures 2A, 2B:
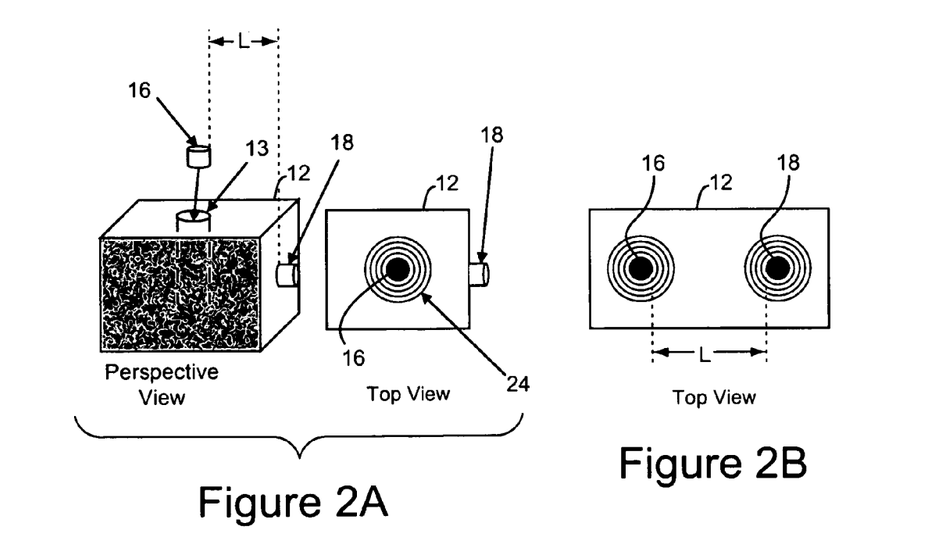
FIG. 2A illustrates in perspective and top views an example configuration of acoustic transducers embedded in a loading bearing medium.
FIG. 2B illustrates in top view another example configuration of acoustic transducers embedded in a loading bearing medium.

FIG. 2A shows a non-limiting example transducer configuration. Any suitable transducer configuration may be used. A bore-hole 13 is made in a top surface of the road 12 to accept the source transducer 16. The source transducer 16 generates acoustic waves that are generally cylindrical, and as shown in the top view, are generally concentric. The acoustic cylindrical waves 24 permit flexible attachment or implantation of the source transducer with respect to orientation. Other waves such as longitudinal or shear or guided waves may also be used. The acoustic waves are detected by the receiver transducer 18 shown in FIG. 2A as attached to the side of the load bearing medium and separated from the source transducer by predetermined distance. The receiver transducer 18 may also be embedded in the load bearing medium in any suitable location. For example, FIG. 2B shows both source and receiver transducer embedded in the load bearing medium beneath the surface. They are separated by a predetermined distance L.

Figure 3:
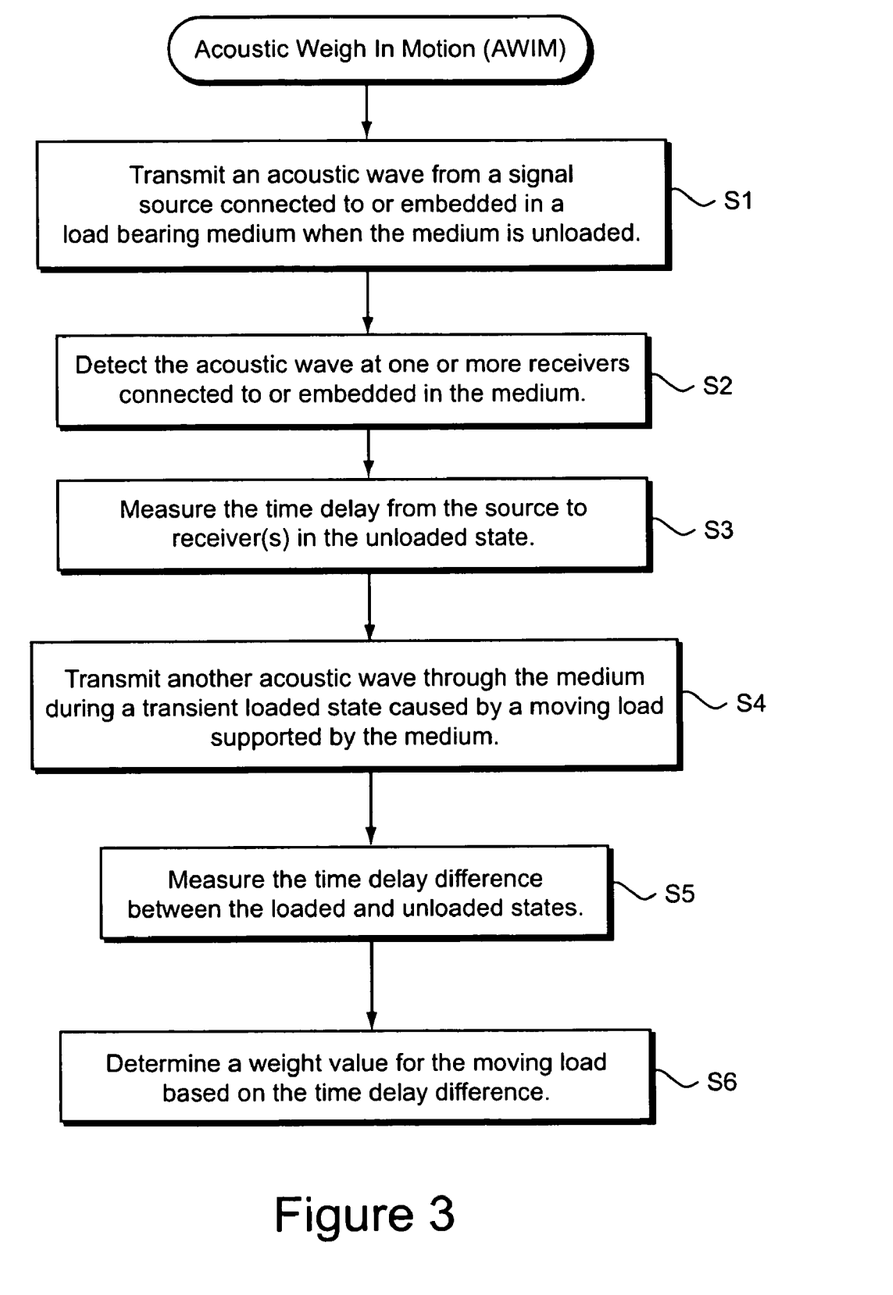
FIG. 3 is a flow chart diagram illustrating non-limiting, example procedures that may be used to acoustically determine the weight or mass of a moving body supported on a load bearing medium.

FIG. 3 is a flow chart diagram illustrating non-limiting, example Acoustic Weigh In Motion (AWIM) procedures that may be used to acoustically determine the weight or mass of a moving body supported on a load bearing medium using, for example, the AWIM system illustrated in FIG. 1. An acoustic wave is transmitted from one or more source transducers attached to or embedded in a load bearing medium when the load bearing medium is in an unloaded state (step S1). The acoustic wave is detected as one or more receivers attached to or embedded in the load bearing medium (step S2). The time delay for the acoustic wave to propagate over an acoustic path through the medium from the source to the receiver transducers in the unloaded state is determined (step S3). Another acoustic wave is transmitted over the acoustic path through the load bearing medium during a transient loaded state caused by a moving load supported by the load bearing medium (step S4). The difference in the time delay for the subsequent acoustic wave to propagate over the acoustic path through the medium from the source to the receiver transducers in the unloaded and loaded states is determined (step S5). A weight or mass value is then determined for the moving load based on the time delay difference (step S6). In essence, the weight of the vehicle compresses the highway changing the local density and the local dimensions. The acoustic propagation time delay through this medium is altered by the change in density and length. Generally, acoustic velocity is linked to the square root of the ratio of the elastic constant divided by the density.

Figure 4:
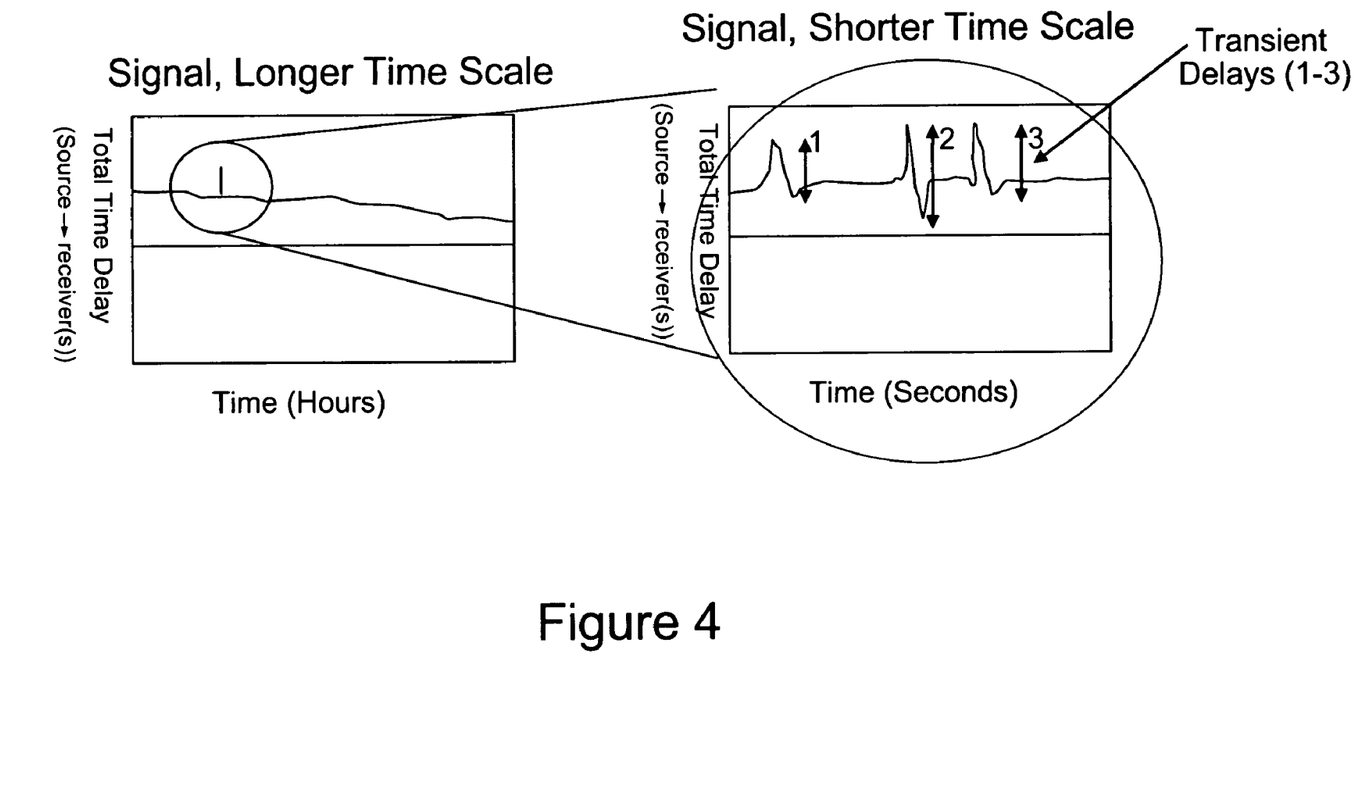
FIG. 4 is a graph illustrating transient acoustic wave propagation time delays associated with three moving vehicles traveling over an acoustic path in a road.

FIG. 4 is a graph illustrating transient acoustic wave propagation time delays associated with three moving vehicles traveling over the acoustic path between transducers embedded in the load bearing medium. The graph on the left shows the acoustic wave propagation time delay associated with an acoustic wave traveling through the load bearing medium between source and receiver in a generally unloaded state during which three vehicles passed. Gradual, relatively small changes in propagation delay may occur over relatively long time periods as a result of environmental factors like temperature, moisture, etc. By contrast, large transient spikes in the acoustic wave propagation time delay are detected when a vehicle passes over the acoustic path in the load bearing medium. Three separate transient delays 1-3 are shown in an expanded time scale in the figure on the right corresponding to three moving vehicles passing over the acoustic path in the load bearing medium. The weight or mass of the vehicle is related to the magnitude of the transient amplitudes by a calibration factor described below, with larger delay amplitudes corresponding to heavier weight or mass.

Figure 5:
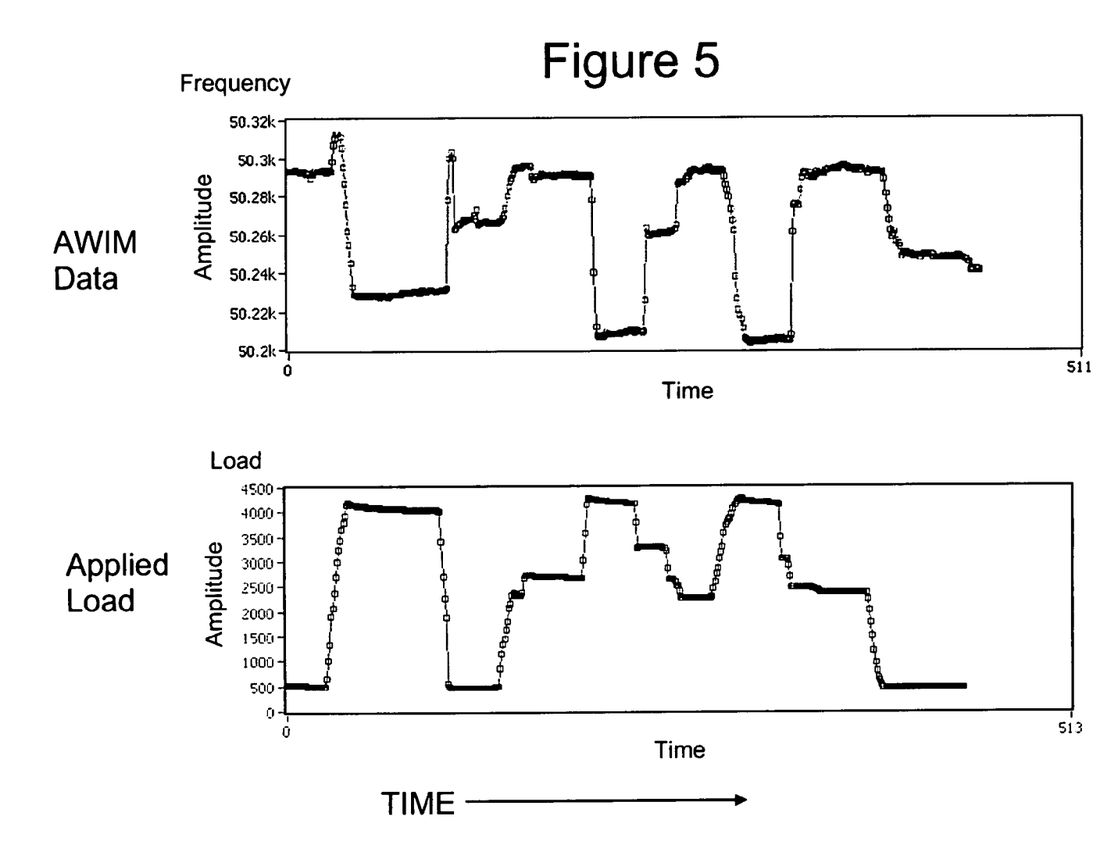
FIG. 5 shows graphs of experimental data illustrating transient acoustic wave propagation time delays associated with transient loads on an acoustic path embedded in a concrete slab.

FIG. 5 is a graph that shows experimental data for a concrete load bearing slab subjected to compressive loads. (The data is not corrected for initial compression.) An acoustic wave propagates across the concrete slab and is received by a phase locked loop implementation of AWIM system (an example of which is described below). The change in frequency (representing the change in acoustic wave propagation delay time between unloaded and loaded states) corresponds to the weight of the applied load. There is no change in phase on this time scale since the phase locked loop keeps the system in quadrature at nearly constant phase. The upper plot is the AWIM data as a function of time. The lower plot is the load as a function of time. As the load increases at the start of the lower figure, the concrete AWIM data exhibits a general decrease in frequency. When the load is removed, the data reverses itself. Since this was the first loading of a low-strength block of concrete, it exhibits properties that should stabilize if it were road material.

Figure 6:
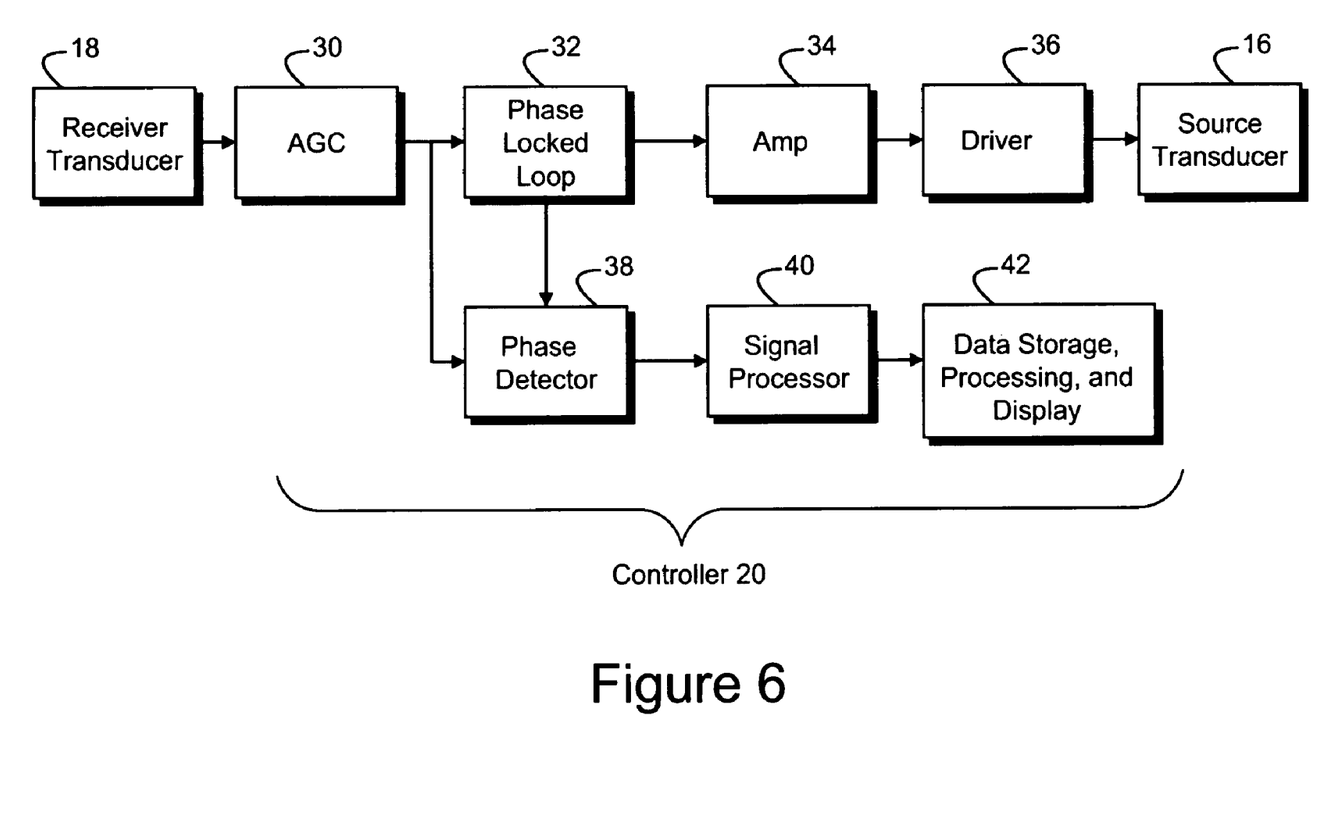
FIG. 6 is a function block diagram of a non-limiting example PLL-based AWIM system.

FIG. 6 shows in function block form an example of a AWIM controller 20 coupled to the source and receiver transducers 16 and 18. The detected acoustic wave signal from the receiver transducer 18 is amplified to a predetermined level by an automatic gain controller (AGC) 30. The amount of gain required to achieve that level is a direct measure of the attenuation changes in the closed phase locked loop. Knowledge of attenuation permits assessment of roadway or system damage. The amplified signal is fed to a phase-locked-loop (PLL) 32 which keeps the closed loop at a stable frequency that follows environmental conditions, such as temperature and moisture. The time constants of the PLL 32 are usually very slow compared to the transient time associated with the time of transit of the vehicle over the acoustic path in the load bearing medium. The output frequency signal from the PLL 32 is preferably provided to a high impedance amplifier 34 to isolate the PLL 32 from extraneous signals. The resulting output goes into a low impedance driver 36 that drives the source transducer 16 to generate another acoustic wave.

The phase-locking part of this system is the top part of the figure, while the phase measurement part is shown in the lower part of the figure. The time constant for the top part of the figure is long, e.g., on the order of a second or longer, while the time constant of the lower part of the figure is fast, e.g., on the order of milliseconds. The phase locking system therefore generates a baseline from which the moving vehicle weight is referenced. The timing can be adjusted for different road conditions. An alternate example implementation for determining the acoustic wave time delay could use a stable, fixed frequency source in place of the PLL. Other implementations are possible.

Figure 7:
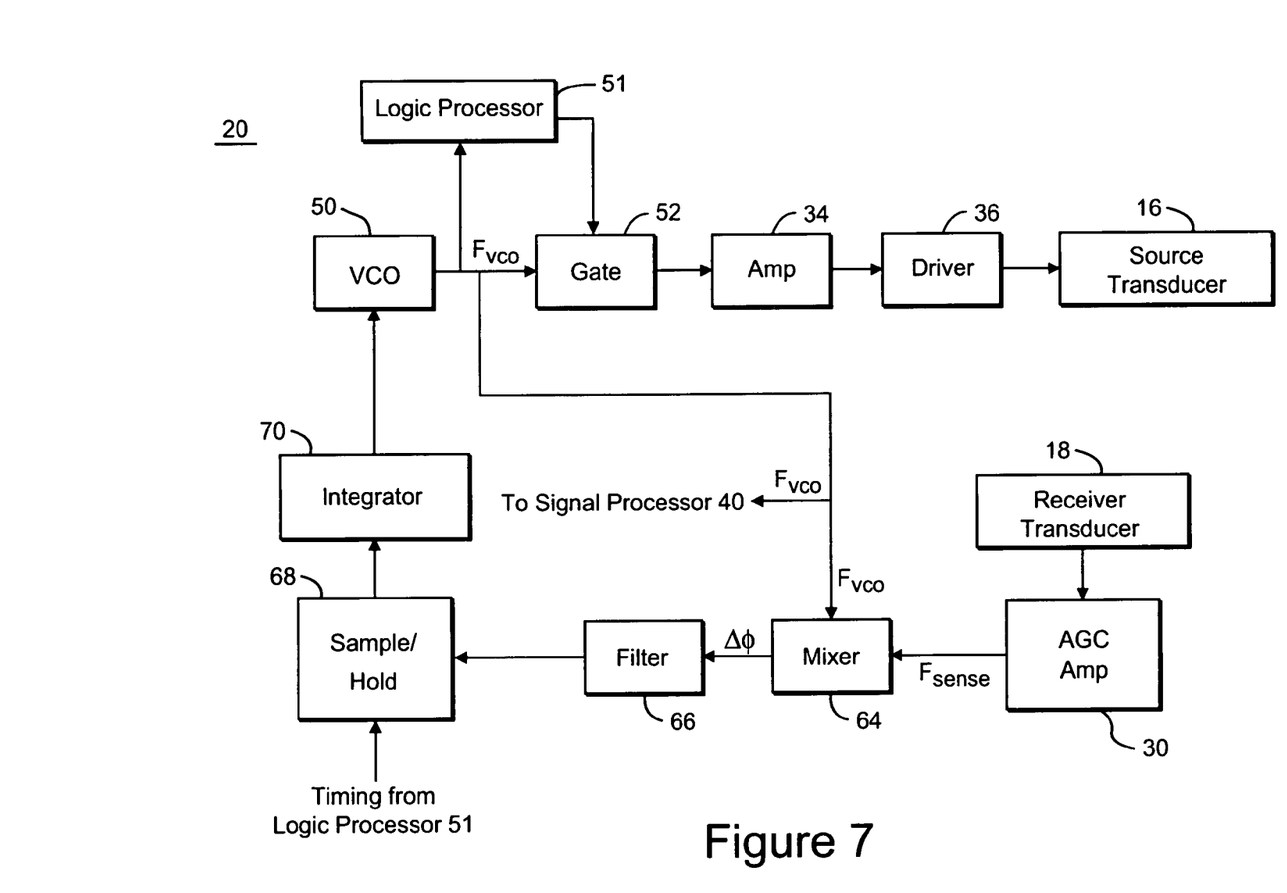
FIG. 7 is a function block diagram of a non-limiting example PLL implementation of the AWIM controller shown in FIG. 5.

One non-limiting, example phase locking approach for the phase locked loop AWIM implementation is now described in conjunction with FIG. 7, which shows details of a non-limiting, example of a pulsed phase locker 20. Reference may also be made to U.S. Pat. No. 4,363,242. The elements of FIG. 7 replace the top line blocks of FIG. 6. A voltage controlled oscillator (VCO) 50 outputs a radio frequency $F_{VCO}$ which is coupled to a gate 52, the timing of which is controlled by logic processor 51. The VCO output $F_{VCO}$ is also provided to the logic processor 51 and is used to calculate the weight or mass of the load moving over the load bearing medium, as was explained earlier. The VCO frequency output $F_{VCO}$ is also supplied to a mixer 64.

The gate 52 outputs a signal which is amplified in an amplifier 34, impedance matched by driver 36, and the source transducer 16 generates an acoustic wave corresponding to that signal which propagates along the load bearing medium acoustic path to the receiver transducer 18. The receiver transducer 18 detects the acoustic wave and generates an output that is amplified at an automatic gain controller (AGC) amplifier 30, which keeps the level of the detected signal within the dynamic range of the mixer 64.

Because the acoustic wave has been delayed in the process of propagating over the acoustic path through the load bearing medium, at an initial unlocked frequency, the detected signal $F_{sense}$ is out of the phase relationship that it should have with the frequency $F_{VCO}$ output by the VCO 50. At a quadrature condition, when the phase difference is 90° between the reference VCO signal and the measured signal, and the voltage output of the mixer 64 is exactly zero. The mixer output voltage is composed of two frequencies: the difference frequency and the sum frequency derived from the two mixer inputs. Since for this example circuit, both inputs come from the VCO 50, they are at the same frequency, but time-shifted by the acoustic path. The difference frequency, which is at zero Hertz (D.C.), provides the control voltage used in this PLL device. The sum frequency, which is twice the VCO frequency, is removed by the filter 66. In this configuration, the mixer 64 detects a delta $\Delta\phi$ phase amount, either lagging or leading, and generates a positive voltage or a negative voltage corresponding to the size and direction of the delta. That voltage is sampled in a sample-and-hold block 68 under the control of timing from the logic processor 51. The sampled output is integrated at an integrator 70, and the ramp output of the integrator 70 either increases or decreases the output frequency of the VCO 50 in order to reduce the phase difference delta Δϕ to zero. This zero condition is referred to as "quadrature lock."

The signal processor 40 in FIG. 6 detects a change or difference in velocity of the acoustic signal between the loaded and unloaded conditions. The velocity of the acoustic wave moving through load bearing medium is related to the frequency of that wave by the following relationship:

$$V = 2FL/M, \quad (1)$$

where V is the acoustic wave velocity, F is the acoustic wave frequency, L is the effective distance between the source and receiver transducers 16 and 18, and M is a constant depending on the acoustic wave harmonics. This condition is created with the phase-locking system. Any relative change in the acoustic velocity through the load bearing material will be revealed by changes in the frequency, F.

In the context of FIG. 7, the signal processor 40 in FIG. 6 receives a phase P1 from the phase locked loop 32 when the load bearing medium is an unloaded condition and a phase P2 when the load bearing medium is a loaded condition. A normalized phase difference ΔP/P may then be determined by subtracting P1 and P2 and dividing the difference by P1. The difference in load is the difference between the unloaded force and loaded force on the load bearing medium. Thus, by detecting the change in phase, we have a measure of the change in wave velocity which is related to a change in stress state or strain in the load bearing medium. This relationship may be stated as:

$$[(P2-P1)/P1]*K = \Delta S \quad (2)$$

where S is the stress or strain on the load bearing medium and K is a calibration constant. Given S, the weight or mass of the moving load is calculated.

The top branch of blocks in FIG. 6 creates a stable, locked signal that is at quadrature on the average for the PLL to lock. The velocity of sound in concrete is nominally $3.4 \times 10^5$ cm/sec. At a frequency of 2 kHz, the wavelength is about 2 m. In the U.S., the typical highway lane width is 12 feet or about 3.7 m. For this example, there will be about 2 wavelengths of sound in a highway lane. The PLL will lock at a frequency corresponding to a 90 degree phase shift (or n2π+90). For the 3.7 m path, the PLL will lock at about 1.6 kHz for one harmonic. This frequency can be adjusted with electronic phase shifting in the PLL loop, if necessary or desired.

In an additional example embodiment, the phase can be measured from digitized signals from the receiver transducer (s) using trigonometric functions of phase measurements to calculate the phase directly from the phase reference from the source oscillator. This is accomplished by measuring the phase of the received signal and calculating the equivalent time delay from the phase change using:

$$\arctan\left[\frac{\left(-1 \cdot \frac{A}{2} \cdot \sin(\varphi_o - \varphi_r)\right)}{\left(-1 \cdot \frac{A}{2} \cdot \cos(\varphi_r - \varphi_o)\right)}\right] = \arctan\left[\frac{\sin(\varphi_o - \varphi_r)}{\cos(\varphi_r - \varphi_o)}\right]$$

$$= \varphi_o - \varphi_r = \Delta\varphi$$

where $\phi_r$ is the phase reference and $\phi_o$ is the phase signal.

A benefit of a PLL loop approach is the ability to track long-term shifts in the load bearing medium caused by environmental or other conditions. The upper path of function blocks in FIG. 6 is used to determine a "baseline" measurement path of acoustic time delays through the load bearing medium in a generally unloaded state. The PLL frequency is the reference signal compared by the phase detector 38 to the signal received from the amplified receiver transducer signal. The output from the phase detector 38 is a voltage proportional to the phase difference between the received signal and the reference signal. The signal processor 40 uses, for example, a fast filter to extract the time delay signal. A time constant of the filter is set for the expected period during which the vehicle passes over the acoustic sensor path. For example, a truck of length 19 feet traveling at 60 mph may require 0.2 seconds to pass over the acoustic path. Therefore, the time constant for the acoustic sensor system must be on the order of 10 Hz or a time constant on the order of 0.1 seconds. Because the PLL time constant should be much greater than 0.1 seconds, transient events occur faster than the PLL can slew, and thus, such changes are outside the dynamic signal bandwidth of the acoustic phase locking path signal. A transient acoustic propagation time delay measurement signal generated by a moving vehicle is therefore produced by mixer 38 and is passed to the signal processor 40 and is provided to the data processor 42 for storage, and if desired, displayed. The data processor 42 processes the received information from the phase delay data.

The signal amplitude derived from the AGC signal in FIG. 6 can be used to determine the integrity of the road and/or the AWIM itself. Should a crack occur in the road, the acoustic amplitude transmitted from the source to the receiver will drop in value based on the severity of the crack. Likewise, should the transducer malfunction, the signal amplitude might drop. The AGC will increase the gain to compensate for the signal loss. A significant change in AGC gain is an indicator of damage. The AGC gain may therefore be monitored to detect the presence of cracks or other flaws and evaluate them.

Figure 8:
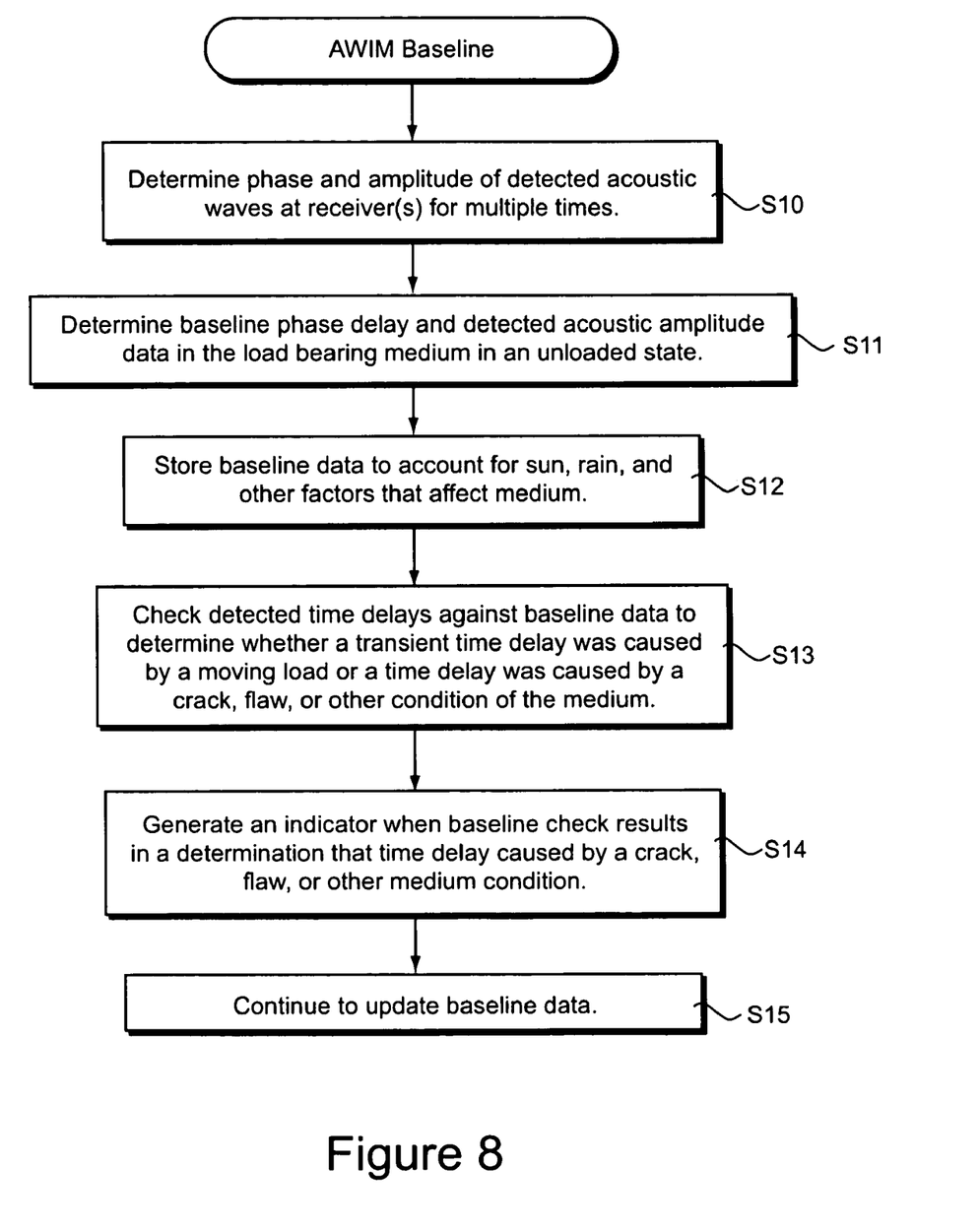
FIG. 8 a flow chart diagram illustrating non-limiting, example procedures that may be used to determine an acoustic baseline for a load bearing medium in an unloaded state.

FIG. 8 is a flowchart that illustrates example non-limiting procedures for determining and updating AWIM baseline data that could be stored in a database. The phase and amplitude of detected acoustic waves received at the receiver transducer(s) are determined (step S10). Baseline phase delay and detected acoustic amplitude data in the load bearing medium in an unloaded state are determined (step S11). That baseline data are accumulated over time and stored in memory, e.g., a database, and preferably used to account for environmental factors that affect the acoustic properties of the load bearing medium such as temperature, moisture, etc. (step S12). Subsequently detected time delays are checked against the baseline data to determine whether a transient time delay was caused by a moving load or the detected time delay was caused by a crack, flaw, or other condition of the load bearing medium (step S13). Some type of indication is preferably generated with the baseline check results in a determination that the time delay was caused a crack, flaw, or other condition of the load bearing medium (step S14). Further measurements are taken to update the baseline data (step S15).

Calibration of an AWIM system may be achieved by having a vehicle of known weight or mass drive over the sensor system and having the specific data for that vehicle identified by any means. Calibration of the sensitivity of the system to load is achieved by measuring the slope of the acoustic wave propagation time delay change as a function of vehicle load. This may be performed as part of an initial AWIM system set-up, and preferably is performed, for example, at different temperatures and water percolation levels to compare to standards. The initial calibration is followed preferably by periodic calibrations to validate the performance of the AWIM system over time.

More specifically, the load shown in FIG. 5 is related to the AWIM measurement through the change in time delay, dT. The time delay is found in this system through dT=[dF/F]*T, where F is the frequency. The load or weight, P, for example in units of pounds, is calculated using a calibration factor, C. Weight or load P=C*dT. The calibration factor C is determined by driving known weight vehicles over the roadbed to measure the change in time delay to determine the value of C as is shown for three different vehicles with known weights in FIG. 4. If C is not constant for the three different vehicle measurements, additional different weight vehicles are used to obtain the shape and amplitude of a calibration curve. In this case, the curve may be stored in lookup table form. The time delay is used as an input to the look-up table which generates an appropriate weight. Alternatively, an equation for the curve may be generated, and the weight determined by inputting the value dT to the equation.

In another example application, AWIM sensors can be placed in or under a concrete, asphalt, or other slab in front of a critical entry point such as the path into a building or complex. The AWIM system monitors the changing loads on the slab which represent ingress or egress of people or vehicles entering the pathway. With AWIM resolution and knowledge of typical ingress/egress responses for the path, AWIM signal profiles can be developed for individuals, groups of people, vehicles, or other load inducing elements and used for subsequent AWIM identification of same.

Figure 9:
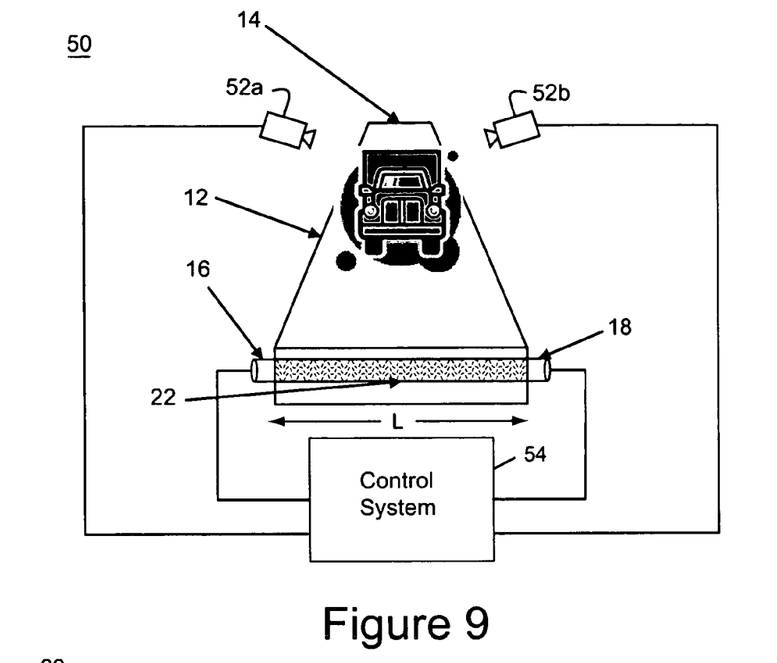
FIG. 9 illustrates another non-limiting example of AWIM applied to weighing a truck moving over a road that incorporates image processing.

FIG. 9 shows another embodiment 50 in which one or more cameras are used in combination with AWIM. For example, two video cameras 52 and 52b are mounted to detect passing vehicles or persons or other objects moving along the load bearing medium 12. A truck 14 is shown for illustration purposes. A control system 54 may include an image processor configured to identify unusual events such as a person carrying a briefcase, bag, or other object detected by a camera coupled with a detected excessive weight for that person. Image recognition processing may also be used to identify specific vehicles, license plate or other identifying information, and specific people by their stride or gate.

Figure 10:
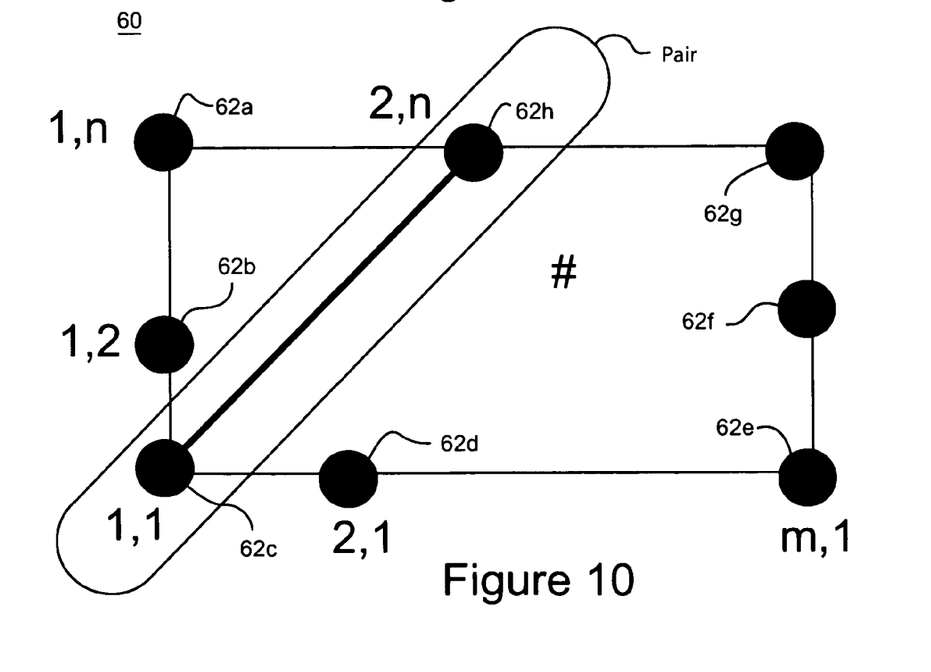
FIG. 10 illustrates conceptually a network of AWIM transducers.

Multiple AWIM sensors may be used to create a region of sensing using tomography-like analysis to assess loads within a monitored area. FIG. 10 shows an array of acoustic transducers (1,n to m,1). Any pair of acoustic transducers may function as a separate AWIM system. One example pair is shown with an acoustic path (shown as a line) connecting acoustic transducers 1,1 and 2,n. By switching between all pairs, a complex set of acoustic paths or lines is created such that the load/weight/mass at point # can be determined from the changes in the AWIM data. This approach is similar to tomography where lines of data are inverted by back-projection to create an image of the object density.

Figure 11:
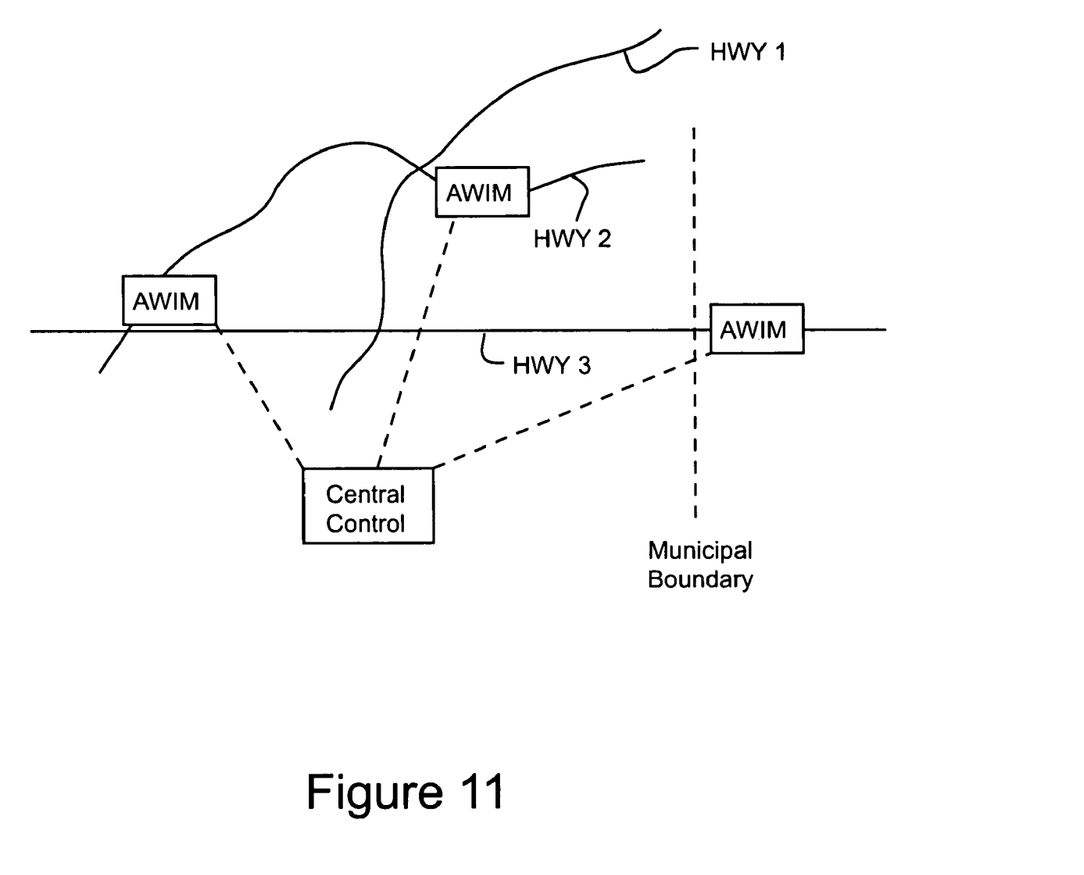
FIG. 11 illustrates a network of AWIM controllers.

In addition to switching between acoustic transducers in an array in a single AWIM system, an array of AWIM systems may be employed. FIG. 11 illustrates an example of a network of AWIM systems positioned at strategic geographic positions in a highway system. The AWIM systems are connected to a central control point which allows wide area monitoring and detection of the weight or mass of moving vehicles. Such a network could also be applied on a smaller geographic scale and is not limited to moving vehicles.

The impact of AWIM technology is both immediate and potentially far-reaching. Although there has been interest in using nonlinear measurements in civil structures, practical nonlinear measurements are still lacking. For example, high-power ultrasonic devices are required to generate detectable harmonic signals. The AWIM technology, in contrast, based on time delays in propagation velocity provides sensitive measurements with extraordinary resolution at much lower cost and lower power. The dynamic nature of a drive-by weighing or other weighing of moving objects creates a differential signal that is time-filtered to extract only those changes that accompany the passage of the vehicle. Changes in baseline data caused by temperature or water percolation are removed. Calibration parameters may be used to correct for the effects of temperature or water percolation on the slope of the phase change as a function of vehicle load.

AWIM offers other advantages. Being able to weigh objects on the move rather than requiring those moving loads to stop is very beneficial in terms of efficiency and time savings for any kind of detection or checking facility or operation. The AWIM sensing system uses the load bearing medium (e.g., a road slab) itself to sense the moving load. As a result, the sensor system is less influenced by small changes directly near the transducers themselves. Furthermore, an AWIM sensing system integrates the impact of the vehicle weight over the acoustic propagation path through the medium thereby detecting the entire vehicle weight independent of the vehicle path. Although other monitors could possibly be used to measure strain, such as a strain gage or a piezowire, they would not integrate all loads between strain sensing points. AWIM transducers also can be buried well below the surface of the load bearing medium, improving robustness as compared to sensors that need to be at or near the surface. Moreover, the ultrasonic sensor pairs may be randomly placed to thwart attempts to confuse the measurement, e.g., drive directly over the sensor itself.

AWIM can also be used to measure other properties than weight. Temperature and water can also alter the roadbed velocity. Knowing existing parameters, for example temperature, AWIM may be used to determine a underground water main leak by seeing its impact on a sensor system for example like the one shown in FIG. 10 where a network of sensors is deployed. Similarly, if one knows the medium is dry, then the sensor can determine unusual heat, such as may occur from a vehicle fire. Other measurement parameters are also possible such as geodynamic effects from a sink-hole or geo-strains that can provide an early-warning indicator of an earthquake.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. No claim is intended to invoke paragraph 6 of 35 USC § 112 unless the words "means for" are used.

The invention claimed is:

1. A method for weighing a moving load moving over a load bearing medium, comprising:

sending a first acoustic wave from a source acoustic transducer, attached to or embedded in the loading bearing medium, through the load bearing medium in an unloaded state;

detecting the first acoustic wave at a receiving acoustic transducer, attached to or embedded in the loading bearing medium, wherein an acoustic path is defined in the load bearing medium between the source and receiving transducers;

determining a first acoustic wave propagation time delay associated with the acoustic path in an unloaded state based on the sending and detecting of the first acoustic wave;

when the acoustic path is loaded by a moving load supported by the medium, sending and detecting a second acoustic wave from the source acoustic transducer to the receiving acoustic transducer;

determining a second acoustic wave propagation time delay associated with the acoustic path in a loaded state based on the sending and detecting of the second acoustic wave;

determining an acoustic propagation time delay difference between the first and second acoustic wave propagation time delays for the unloaded and loaded states; and determining a weight or mass of the moving load based on the acoustic propagation time delay difference.

2. The method in claim 1, wherein the moving load includes a moving vehicle or a moving object.

3. The method in claim 1, wherein the loading bearing medium is a road, a ship deck, an aircraft runway, a moving belt, a moving-person support medium, or a moving-animal support medium.

4. The method in claim 1, further comprising:
establishing a baseline for the acoustic wave propagation time delay associated with the acoustic path in the unloaded state by determining the acoustic wave propagation time delay associated with the acoustic path in the unloaded state over time to account for environmental or other changes affecting the propagation time delay associated with the acoustic path in the unloaded state, and using the baseline to ensure that the determined acoustic propagation time delay difference between the first and second acoustic propagation time delays for the unloaded and loaded states is attributable to the moving load over the acoustic path.

5. The method in claim 1, wherein the acoustic propagation time delay difference is associated with a change or difference in a velocity V of the acoustic wave over the acoustic path, and wherein $V=2FL/M$, with F being the acoustic wave frequency, L being a distance between the source and receiver transducers, and M being a constant depending on a harmonic of the acoustic wave.

6. The method in claim 1, wherein the acoustic propagation time delay difference is determined using a phase locked loop.

7. The method in claim 1, further comprising:
using a moving load with a known weight or mass to calibrate the acoustic wave propagation time delay associated with the acoustic path in one or both of the unloaded state and the loaded state.

8. The method in claim 1, wherein multiple source and receiving acoustic transducers are attached to or embedded in the load bearing medium and each source-receiver transducer pair through the load bearing medium defines an associated acoustic path, the method further comprising:
determining acoustic propagation time delay differences for the associated acoustic paths; and
determining a weight or mass of the moving load based on the acoustic propagation time delay differences.

9. The method in claim. 1, further comprising:
imaging the moving load to determine information for identifying the moving load.

10. The method in claim 1, further comprising:
developing weight or mass profiles for particular moving objects, and
using the weight or mass profiles to identify a particular object moving over the acoustic path.

11. The method in claim 1, further comprising:
arranging multiple source acoustic transducers and multiple receiver acoustic transducers in an array across an area of the load bearing medium to establish multiple acoustic paths through the load bearing medium between each source-receiver acoustic transducer pair, and selecting certain ones of the source-receiver acoustic transducer pairs to determine a weight or mass associated with a moving load at a particular point in the area of the load bearing medium.

12. The method in claim 1, further comprising:
monitoring a network of source-receiver acoustic transducer pairs at different geographic locations.

13. Apparatus for weighing a moving load moving over a load bearing medium, comprising:
a source acoustic transducer, attached to or embedded in the load bearing medium, for sending a first acoustic wave through the load bearing medium in an unloaded state;

a receiving acoustic transducer, attached to or embedded in the load bearing medium, for detecting the first acoustic wave having propagated through the load bearing medium, wherein an acoustic path is defined in the load bearing medium between the source and receiving transducers;

electronic circuitry configured to:
determine a first acoustic wave propagation time delay associated with the acoustic path in an unloaded state based on the sending and detecting of the first acoustic wave;

initiate sending a second acoustic wave from the source acoustic transducer to the receiving acoustic transducer when the acoustic path is loaded by a moving load supported by the medium;

determine a second acoustic propagation time delay associated with the acoustic path in a loaded state based on sending and detecting of the second acoustic wave;

determine an acoustic propagation time delay difference between the first and second acoustic propagation time delays for the unloaded and loaded states; and determine a weight or mass of the moving load based on the acoustic propagation time delay difference.

14. The apparatus in claim 13, wherein the moving load includes a moving vehicle or a moving object.

15. The apparatus in claim 13, wherein the loading bearing medium, is a road, a ship deck, an aircraft runway, a moving beltway, a moving-person support medium, or a moving-animal support medium.

16. The apparatus in claim 13, wherein the electronic circuitry is further configured to:
establish a baseline for the acoustic wave propagation time delay associated with the acoustic path in the unloaded state by determining the acoustic wave propagation time delay associated with the acoustic path in the unloaded state over time to account for environmental or other changes affecting the propagation time delay associated with the acoustic path in the unloaded state, and use the baseline to ensure that the determined acoustic propagation time delay difference between the first and second acoustic propagation time delays for the unloaded and loaded states is attributable to the moving load over the acoustic path.

17. The apparatus in claim 13, wherein the acoustic propagation time delay difference is associated with a change or difference in a velocity V of the acoustic wave over the acoustic path, and wherein V=2FL/M, with F being the acoustic wave frequency, L being a distance between the source and receiver transducers, and M being a constant depending on a harmonic of the acoustic wave.

18. The apparatus in claim 13, wherein the electronic circuitry includes a phase locked loop to determine the acoustic propagation time delay difference.

19. The apparatus in claim 13, wherein the electronic circuitry is further configured to:
calibrate the acoustic wave propagation time delay associated with the acoustic path in one or both of the unloaded state and the loaded state when a moving load with a known weight or mass moves over the acoustic path.

20. The apparatus in claim 13, further comprising:
multiple source and receiving acoustic transducers attached to or embedded in the load beating medium, each source-receiver transducer pair through the load bearing medium defining an associated acoustic path,
wherein the electronic circuitry is further configured to:
determine acoustic propagation time delay differences for the associated acoustic paths; and
determine a weight or mass of the moving load based on the acoustic propagation time delay differences.

21. The apparatus in claim 13, further comprising:
one or more cameras for imaging the moving load,
wherein the electronic circuitry is further configured to determine information for identifying the moving load on image information from the one or more cameras.

22. The apparatus in claim 13, wherein the electronic circuitry is further configured to:
develop weight or mass profiles for particular moving objects, and
identify a particular object moving over the acoustic path using the weight or mass profiles.

23. The apparatus in claim 13, further comprising:
multiple source acoustic transducers and multiple receiver acoustic transducers arranged in an array across an area of We load bearing medium to establish multiple acoustic paths through the load hearing medium between each source-receiver acoustic transducer pair,
wherein the electronic circuitry is further configured to:
select certain ones of the source-receiver acoustic transducer pairs to determine a weight or mass associated with a moving load at a particular point in the area of the load bearing medium.

24. A network of source-receiver acoustic transducers as recited in claim 13, wherein different source-receiver acoustic transducers pairs are located at different geographic locations, comprising a central controller for monitoring information associated with the source-receiver acoustic transducers pairs at the different geographic locations.

* * * * *

UNITED STATES PATENT AND TRADEMARK OFFICE
CERTIFICATE OF CORRECTION

PATENT NO.        : 7,454,972 B2                                              Page 1 of 1
APPLICATION NO. : 11/513348
DATED             : November 25, 2008
INVENTOR(S)       : Heyman et al.

It is certified that error appears in the above-identified patent and that said Letters Patent is hereby corrected as shown below:

On the facing page of the patent, after item (57) ABSTRACT, line 2, delete "(AWIN)" and insert --(AWIM)--.

In Column 2, line 2, delete "(AWIN))" and insert --(AWIM)--.

Signed and Sealed this

Twenty-seventh Day of January, 2009

JOHN DOLL
*Acting Director of the United States Patent and Trademark Office*